United States Patent
Fedorkow et al.

(10) Patent No.: US 6,769,043 B1
(45) Date of Patent: Jul. 27, 2004

(54) ENSURING FAIR ACCESS TO UPSTREAM TRUNK BANDWIDTH IN ATM SUBTENDED CONFIGURATIONS

(75) Inventors: Guy C. Fedorkow, Bedford, MA (US); John A. Joyce, Nashua, NH (US); Kent H. Hoult, Lexington, MA (US); Michael B. Milano, Groton, MA (US); Nagarajan Swaminathan, Acton, MA (US); Vijay J. Savla, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/546,829

(22) Filed: Apr. 11, 2000

(51) Int. Cl.[7] .......................... G06F 13/00; G06F 13/36
(52) U.S. Cl. ...................... 710/112; 710/111; 710/310; 370/395.3; 370/412
(58) Field of Search ............................... 370/412, 314, 370/60, 395, 338, 375, 398, 395.4, 415, 429, 218, 235, 238, 419; 379/94; 395/800; 710/44, 310, 112, 29, 1; 709/223; 725/116

(56) References Cited

U.S. PATENT DOCUMENTS

| | | | | |
|---|---|---|---|---|
| 4,866,758 A | * | 9/1989 | Heinzelmann | 370/467 |
| 5,231,633 A | * | 7/1993 | Hluchyj et al. | 370/429 |
| 5,506,847 A | * | 4/1996 | Shobatake | 370/338 |
| 5,613,136 A | * | 3/1997 | Casavant et al. | 712/28 |
| 5,625,865 A | * | 4/1997 | Moehrmann | 725/116 |
| 5,812,550 A | * | 9/1998 | Sohn et al. | 370/395.4 |
| 5,862,136 A | * | 1/1999 | Irwin | 370/375 |
| 5,870,629 A | * | 2/1999 | Borden et al. | 370/412 |
| 5,872,938 A | * | 2/1999 | Williams | 710/112 |
| 5,970,062 A | * | 10/1999 | Bauchot | 370/310.2 |
| 6,138,172 A | * | 10/2000 | Shimonishi | 710/1 |
| 6,175,867 B1 | * | 1/2001 | Taghadoss | 709/223 |
| 6,192,422 B1 | * | 2/2001 | Daines et al. | 710/29 |
| 6,266,324 B1 | * | 7/2001 | Kirino et al. | 370/230 |
| 6,301,630 B1 | * | 10/2001 | Chen et al. | 710/310 |
| 6,407,992 B1 | * | 6/2002 | Pasternak et al. | 370/338 |
| 6,408,341 B1 | * | 6/2002 | Feeney et al. | 370/412 |
| 6,411,627 B1 | * | 6/2002 | Hullett et al. | 370/398 |
| 6,418,459 B1 | * | 7/2002 | Gulick | 709/104 |
| 6,452,933 B1 | * | 9/2002 | Duffield et al. | 370/415 |
| 6,608,813 B1 | * | 8/2003 | Chiussi et al. | 370/218 |

OTHER PUBLICATIONS

"NI–2 Card Installation and Configuration for the Cisco 6260," Cisco Systems, Sep. 7, 1999, pp. 1–22.

* cited by examiner

*Primary Examiner*—Glenn A. Auve
*Assistant Examiner*—Christopher E. Lee
(74) *Attorney, Agent, or Firm*—Hamilton, Brook, Smith & Reynolds, P.C.

(57) ABSTRACT

To ensure fair access to upstream trunk bandwidth among a plurality of interface units, a plurality of queues is provided in a first unit. One of the queues is associated with the first interface unit. Each of the remaining queues is associated with one of a plurality of second interface units. Local data is received by the first interface unit and forwarded to the associated queue. Data received from a second, subtended interface unit is forwarded to a queue which associated with the second interface unit. Data is then issued from the queues according to a fairness algorithm. A unique identifier is assigned to each interface unit. Associating a queue with an interface unit is done by associating the queue with the respective interface unit's identifier. In each interface unit, local data is tagged with the instant interface unit's identifier, and received data is forwarded to a queue according to the data's tag. For ATM traffic, data can be tagged by inserting the receiving interface unit's identifier into the generic flow control (GFC) field. Alternatively, a table of associations between virtual channel identifiers (VCIs) and interface unit identifiers may be maintained, and the received data is forwarded to a queue according to the interface unit identifier associated with the data's VCI.

57 Claims, 8 Drawing Sheets

ENSURING FAIR ACCESS TO UPSTREAM TRUNK BANDWIDTH IN ATM SUBTENDED CONFIGURATIONS

BACKGROUND OF THE INVENTION

Digital networks, including local area networks (LANs), wide area networks (WANs), and of course, the Internet, serve to connect various devices which communicate with each other using digital signals. The capacity or bandwidth of a network link dictates how much information it can carry at any given time. Devices known as routers typically form the nodes to which the network links connect. Such a node may be connected to other network nodes, or directly to local traffic. Various protocols are used along the various paths, and even over the same paths.

Asynchronous transfer mode (ATM) is a cell-based networking technology which supports many types of information transfers at very high speeds. Messages are broken into "cells" of 53 8-bit "octets", a 5-byte header and a 48-byte information payload. The header includes a generic flow control (GFC) field and a virtual channel identifier (VCI) field, as well as other fields.

Subtending is a mechanism which allows the linking of a number of interface units into one network trunk port by allowing "lower-level" interface units to connect to "higher-level" units, so that ultimately all of the traffic handled at a particular site passes to the trunk through a single interface unit. This feature allows improved per-port costs for service providers by reducing the number of ports required in an aggregator network where multiple interfaces are installed in one location. Subtending links one or more interface units in one area into one network trunk connection.

One of the most common problems in connecting networking systems together through subtending is known as the "parking lot" problem. As each system gets further away from the trunk interface, it only receives half of the available upstream bandwidth from the system above it. A system once removed from the trunk receives ½ of the available upstream bandwidth, while a system twice removed receives ¼ of the available upstream bandwidth, etc.

Most ATM architectures solve this problem using per VC queuing, in which a separate queue is maintained for every virtual channel. However, per VC queuing is complex and costly.

SUMMARY OF THE INVENTION

To avoid the parking lot problem, upstream traffic is enqueued by its source interface unit in the chain. A round robin scheduler is used to dequeue the traffic and send it to the interface unit above it giving each interface unit an equal share of the available upstream bandwidth. To ensure fairness between each interface unit and the traffic local to the interface unit the round robin scheduler is rate locked to the speed of the local trunk.

In an asynchronous transfer mode (ATM) environment, an interface unit identifier is stored in the generic flow control (GFC) field of each ATM cell. This identifier is passed on until it is received at the interface unit connecting to the network trunk, at which point the GFC field can be cleared for transmission of the cell.

Input queues are used to queue ATM cells received from lower level, or subtended, units as well as ATM cells received from local traffic. Each interface unit has at least an input queue for each subtended interface unit, plus an input queue for its own local traffic. As cells are received from each interface unit, they are stored in the appropriate input queue based on the identifier in the GFC field of the ATM header.

Accordingly, to ensure fair access to upstream trunk bandwidth among a plurality of interface units, a plurality of queues is provided in a first unit. One of the queues is associated with the first interface unit. Each of the remaining queues is associated with one of a plurality of second interface units. Local data is received by the first interface unit and forwarded to the respective queue. Data received from a second, subtended interface unit is forwarded to a queue which is associated with the second interface unit. Data is then issued from the queues according to a fairness algorithm.

In one embodiment, a unique identifier is assigned to each interface unit. Associating a queue with an interface unit is done by associating the queue with the respective interface unit's identifier. In each interface unit, local data is tagged with that interface unit's identifier, and received data is forwarded to a queue according to the data's tag.

Where data is formatted as asynchronous transfer mode (ATM) cells, it can be tagged by inserting the receiving interface unit's identifier into the generic flow control (GFC) field of each cell.

Alternatively, a table of associations between virtual channel identifiers (VCIs) and interface unit identifiers can be maintained. The received data is forwarded to a queue according to the interface unit identifier associated with the data's VCI.

In one embodiment, the fairness algorithm is a round robin algorithm.

Interface units may be interconnected such that a top-level interface unit connects to a network trunk, while each non-top-level interface unit connects directly to an interface unit at a next higher level.

The interface units can be arranged in a tree, daisy-chain or star configuration.

Each queue can also be divided into two or more sub-queues, each sub-queue associated with a different priority. Data is then issued from a queue's highest priority sub-queue that contains data.

One advantage of the present invention is configurability. The user need only specify a unique interface unit identifier through, for example, a command line interface. Software and hardware execute the algorithm without any further intervention.

Another advantage is that the algorithm of the present invention works for any trunk speed. As users move from slower (T1) to faster (OC3) trunk interfaces, they need not reconfigure the box. The hardware is self-timed to the speed of the trunk interface and always ensures fairness.

Another advantage is that because any unit can operate as fast as its subtended link speed, units at the bottom of a tree topology can send data upstream as fast as its subtended link. If no other units in the system are sending traffic upstream, the bottom or lowest-level unit will have full bandwidth use of the upstream network trunk.

Another advantage is that the present invention works well regardless of topology, e.g., a star, tree, or daisy chained topology. The fairness algorithm remains unchanged.

An embodiment of the present invention also supports priority among the various subscribers in a subtended configuration as well. If a subscriber at the bottom interface unit is running high priority voice traffic, while a subscriber at the top unit is running low priority TCP/IP traffic, the high priority traffic will take precedence over the lower priority traffic within the subtended configuration. This results because the input queues are actually per priority per interface unit input queues. Higher priority traffic accesses the upstream trunk bandwidth before lower priority traffic.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
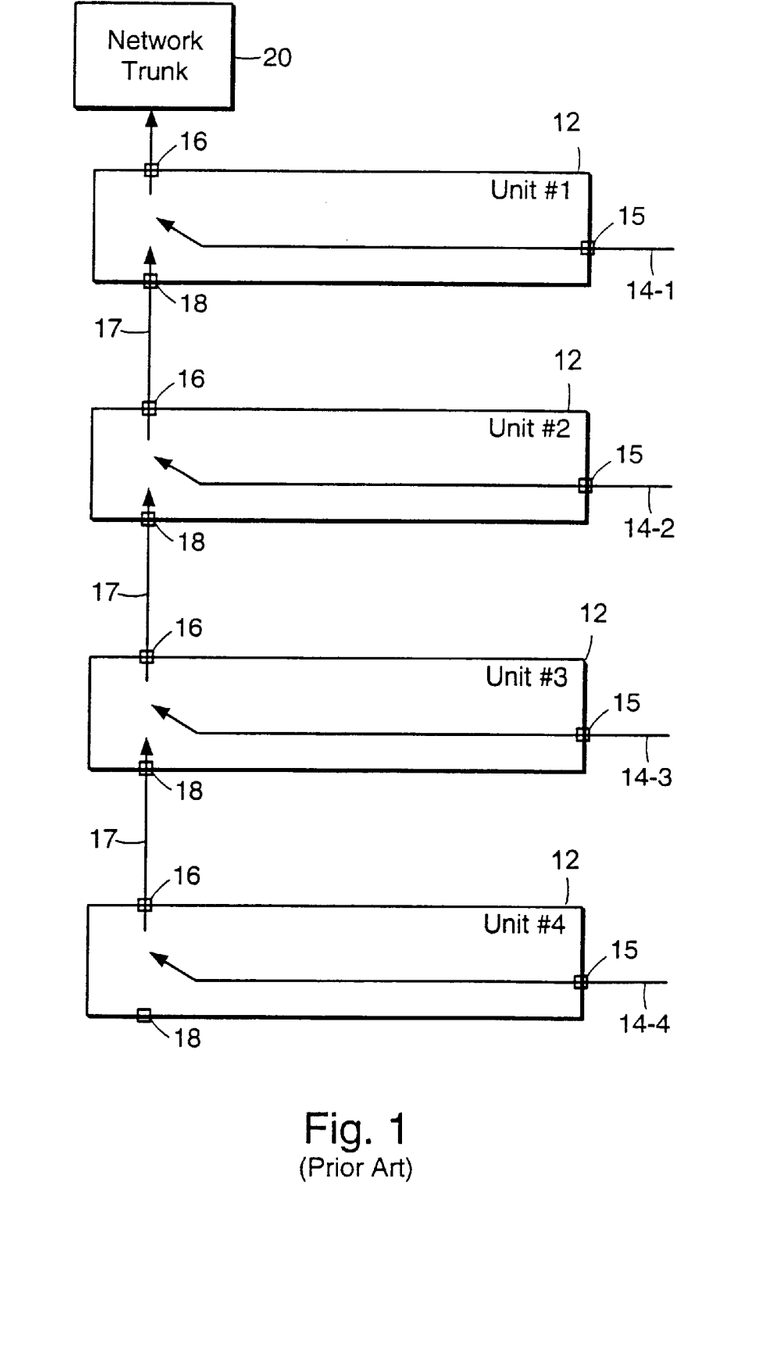
FIG. 1 is a schematic diagram illustrating the parking lot problem.

FIG. 1 illustrates a prior art system 10 comprising, for exemplary purposes, four interface units 12 (i.e., Units #1–#4). Each unit 12 comprises an input port 18 for accepting input from other units, and an output port 16. The output port 16 of one unit 12 is connected via a link 17 to the input port 18 of a unit 12 located at a higher level in the chain. In the case of the highest unit, i.e., Unit #1, the output port 16 is connected to a network trunk 20. The network trunk 20 can carry messages to, for example, the Internet, or other networks. In addition, each unit 12 has a local input port 15 for accepting local traffic 14-1–14-4.

In existing systems, each unit 12, for example Unit #2, typically provides one half of its bandwidth to the local traffic 14, for example 14-2, and one half of its bandwidth to traffic from lower levels received, for example, port 18. Thus, traffic 14-4 received by Unit #4 at port 15 receives ⅛th of the bandwidth available at Unit #1. Therefore traffic 14-4 at Unit #4 does not have as fair a chance of being transmitted as does traffic 14-1 from Unit # 1.

Figure 2:
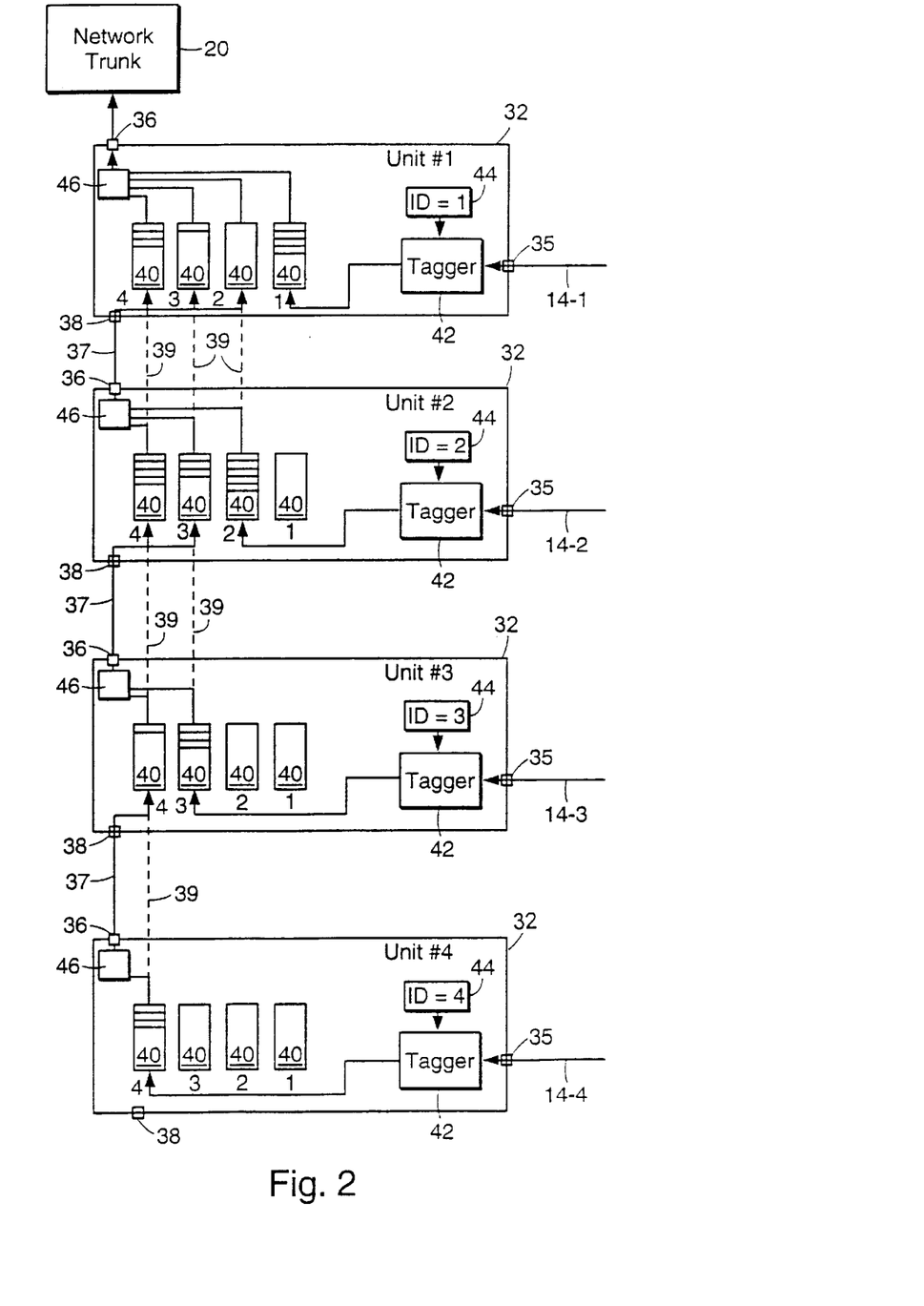
FIG. 2 is a schematic diagram illustrating an embodiment of the present invention in which access to bandwidth is fairly distributed.

FIG. 2 illustrates an embodiment of the present invention in which access to bandwidth is fairly distributed. Here, each interface unit 32 comprises a plurality of queues 40, in this example four queues to support at least itself and its subtended units.

In addition, each unit 32 has a tagger 42 for tagging local incoming traffic 14 with an ID 44 identified with the particular unit 32. For example, here, Unit #1 has been identified as having identifier 1, Unit #2 has been identified as having identifier 2, and so on. Thus, each incoming message is tagged with an identifier which identifies the unit in which it is first received.

In the embodiment of FIG. 2, each unit 32 contains an individual queue 40 for each unit 32 in the system. Each queue 40 is associated with a particular unit 32, and messages tagged with unit ID or identifiers are stored in the associated queue 40.

For example, in Unit #1, a message which has been tagged with identifier 3 is routed to the queue identified or associated with Unit #3. In addition, a queue is assigned to hold local messages 14 which are tagged in the receiving unit 32. The queues 40 are then selected by a scheduler 46 according to a fairness algorithm such as a round robin scheduler.

Dashed lines 39 are used to indicate that messages flow up through the system through the queues associated with the identifiers with which the messages are tagged. Of course, all messages actually travel through the physical links 37, each of which connects the output port 36 of one interface unit 32, for example Unit #4, with the input 38 port of another interface unit, for example Unit #3.

In this manner, messages from each queue 40, that is, messages received locally from each of the units 32, have equal access to the bandwidth and to the network trunk 20.

In one embodiment of the present invention, messages are asynchronous transfer mode (ATM) cells.

Figure 3:
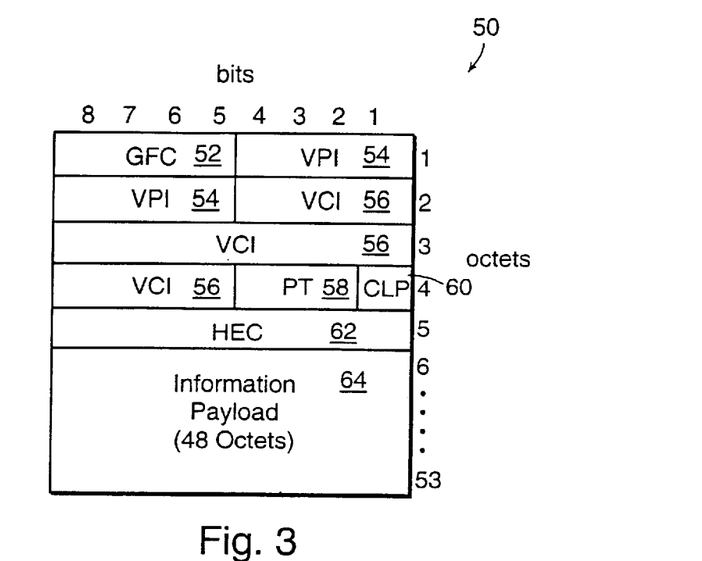
FIG. 3 is a schematic diagram of a typical ATM cell.

FIG. 3 illustrates a typical ATM cell 50. This cell 50 contains a total of 53 octets, each octet containing 8 bits, organized as shown. The generic flow control (GFC) field 52 is generally not used. In one embodiment of the present invention, this GFC field 52 is used to hold the tag, i.e., then receiving units identifier. Thus, this system can provide for up to sixteen identifiers. The tagger 42 (FIG. 2) simply inserts its unit's identifier 44 into this GFC field 52.

Figure 4:
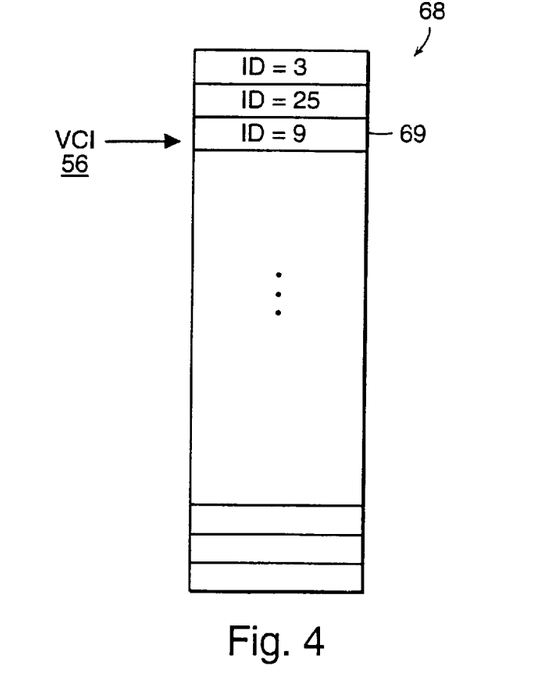
FIG. 4 is a schematic diagram of a look-up table used by an embodiment of the present invention.

Alternatively, as illustrated in FIG. 4, a look-up table 68 may be used, where each entry 69 contains an identifier. The virtual channel identifier (VCI) field 56 of FIG. 3 identifies a virtual channel. This same field 56 can be used to point to a specific entry, for example, entry 69, in the look-up table 68. Here, for example, the VCI field 56 holds a value which points to entry 69 which in turn contains the identifier 9. Thus, this virtual channel is associated with the unit which is assigned the identifier 9.

The other fields of the ATM cell 54–64 are not utilized by the invention and, although important to ATM, are therefore not discussed further.

Figure 5:
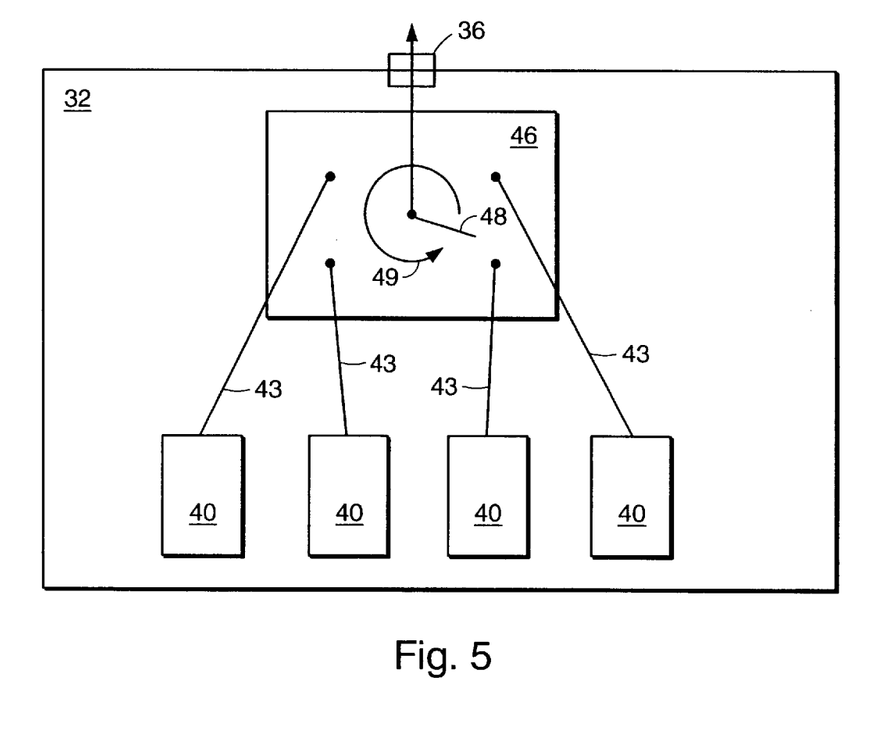
FIG. 5 is a schematic diagram illustrating a round robin fairness schedule algorithm as used by an embodiment of the present invention.

FIG. 5 illustrates a round robin fairness schedule algorithm. The output 43 of each queue 40 connects to a round robin scheduler 46. As shown, a switch 48 rotates in the direction shown by arrow 49, connecting first one of the queues 40 to output 36, and then next queue 40 and so on. Of course, it will be understood, that the round robin scheduler 46 would more typically be implemented in software or digital logic. It would also be understood by those skilled in the art that other fairness algorithms can also be employed.

Figure 6:
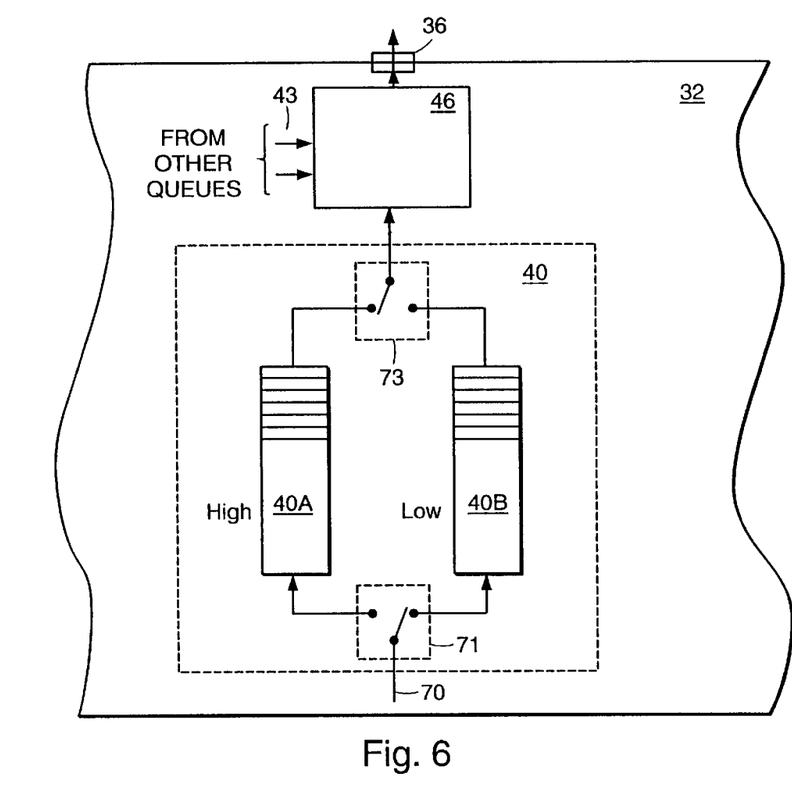
FIG. 6 is a schematic diagram illustrating priority-dependent sub-queues.

FIG. 6 illustrates a further embodiment of the present invention. Here, each queue 40 is logically or physically split into two or more sub-queues 40A, 40B where each sub-queue 40A, 40B is associated with different priority. As a message which may be from local traffic or from another unit enters the queue 40 at 70, switch 71 stores the incoming message into the prioritized sub-queue according to the message's priority. For example, a high-priority message would be passed by switch 71 to sub-queue 40A while a low-priority message would be passed by switch 71 to sub-queue 40B.

Switch 73 passes all messages stored in high priority sub-queue 40A, that is, high-priority messages, to the fairness scheduler 46, before passing any lower priority message from low-priority queue 40B. Of course, switches 71 and 73 can be implemented either in hardware or software.

Figure 7:
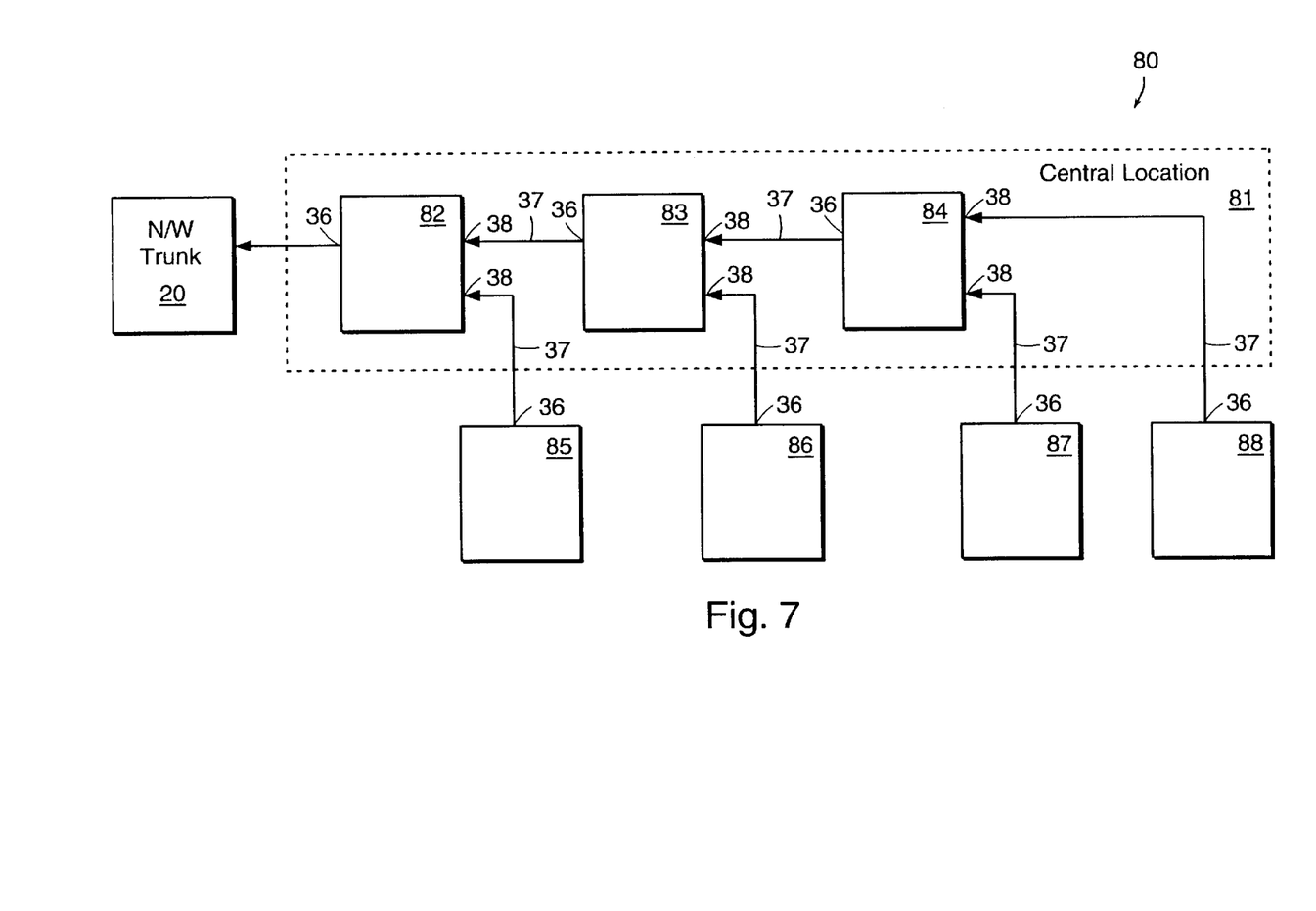
FIGS. 7–9 are block diagrams illustrating various network configuration which are supported by the present invention.
Figure 8:
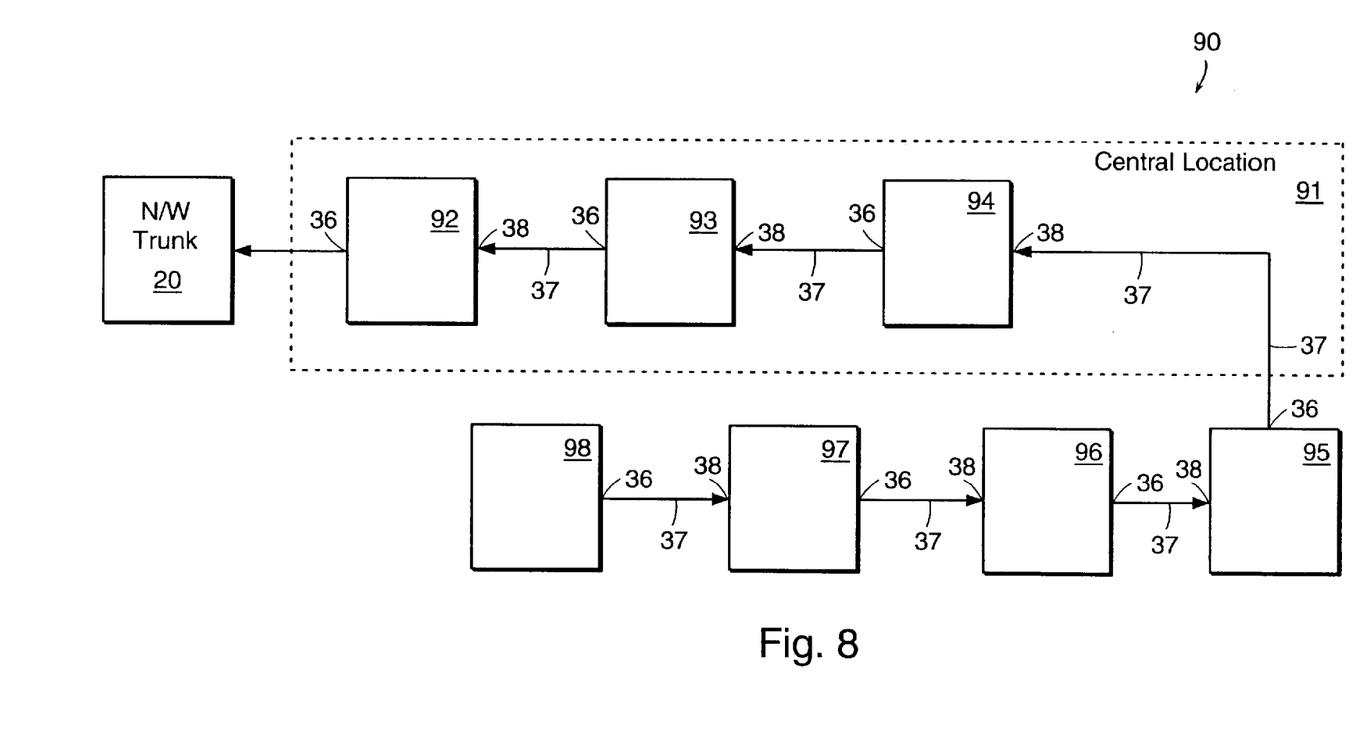
Figure 9:
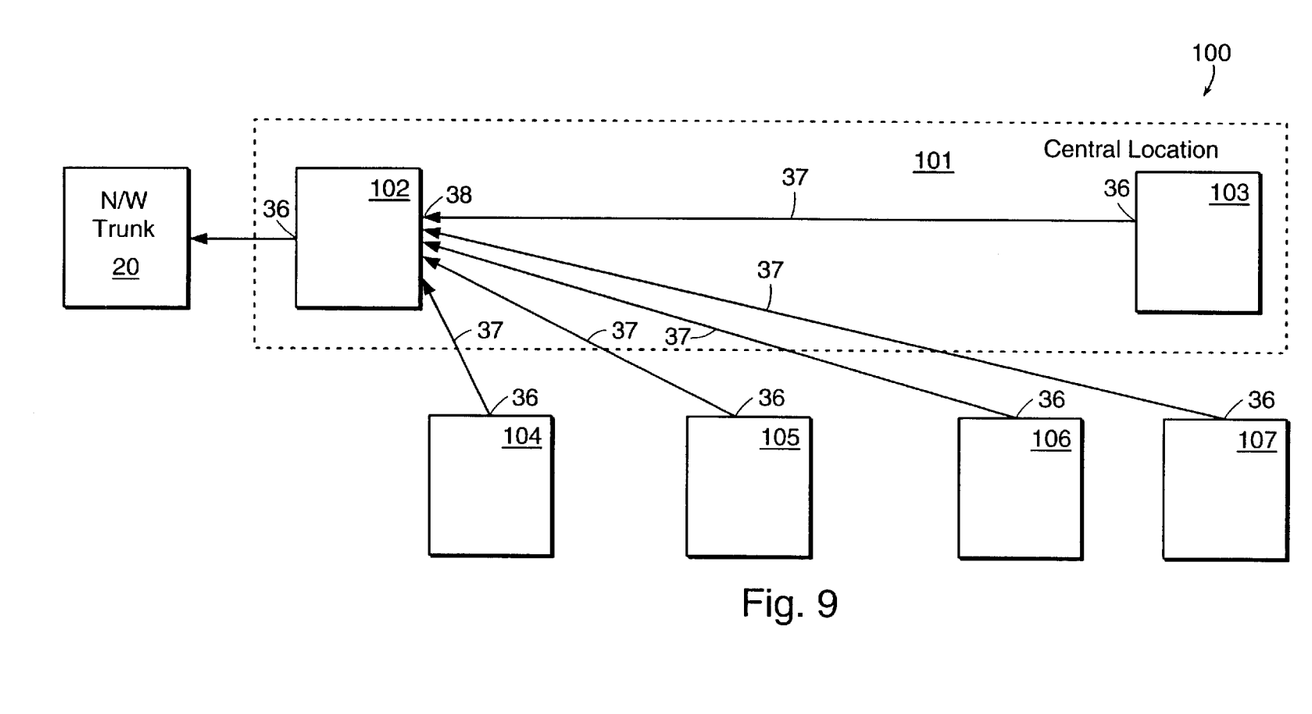

FIGS. 7–9 illustrate various network configurations in which the present invention can be employed.

FIG. 7 illustrates a tree structure 80, in which several interface units 82–84 are located within a central location 81, while several other units 85–88 are located remotely or outside the central location 81. In this particular example, the centrally located units 82–84 each have two inputs 38 to connect to other units. Local traffic input ports such as 14 in FIG. 2 are not shown although it should be assumed that each unit has a local input port 14. Each of the centrally located units 82–84 therefore subtends or branches out to one or more lower-level units in this case units 85–88.

FIG. 8 illustrates a daisy chain structure 90 in which several units 92–94 are located in a central location 91. The last local unit 94 is connected to remote unit 95, which in turn is connected to remote unit 96, and so on.

FIG. 9 illustrates a star configuration 100 in which a top level unit 102 has a plurality of inputs 38, each connecting to a separate unit 103–107. The units can be located within a central location 101 or can be located remotely.

Of course, one skilled in the art would recognize that other combinations of the configurations of FIGS. 7–9 are possible.

It will be apparent to those of ordinary skill in the art that methods involved in the present system for ensuring fair access to upstream bandwidth among a plurality of interface units may be embodied in a computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications or transmission medium, such as a bus or a communications link, either optical, wired, or wireless, having program code segments carried thereon as digital or analog data signals.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for ensuring fair access to upstream trunk bandwidth among a plurality of interface units, the plurality of interface units including a first interface unit and at least two interface units subtended by the first interface unit, comprising, in the first interface unit:
   providing a plurality of queues, each subtended interface unit being associated with an individual queue;
   receiving local data at a first input port, and forwarding the received local data to a queue associated with the first interface unit;
   receiving at a second input port data originating from at least two subtended interface units and forwarding the received data to the corresponding individual queue associated with the respective subtended interface unit; and
   issuing data from the queues according to a fairness algorithm.

2. The method of claim 1, further comprising:
   assigning a unique queue identifier to each interface unit, a queue in the first interface unit being associated with a subtended interface unit by associating the queue with the respective subtended interface unit's queue identifier;
   in each interface unit, tagging local data with a tag comprising the respective interface unit's queue identifier; and
   in the first interface unit, forwarding received data to a queue responsive to the received data's tag.

3. The method of claim 2, wherein data is formatted as asynchronous transfer mode (ATM) cells.

4. The method of claim 3, wherein an ATM cell comprises a generic flow control (GFC) field, wherein tagging local data in each interface unit comprises inserting the respective interface unit's queue identifier into the GFC field.

5. The method of claim 3, wherein an ATM cell comprises a virtual channel identifier (VCI), the method further comprising:
   maintaining a table of associations between VCIs and interface unit queue identifiers, wherein forwarding received data to a queue is responsive to an interface unit queue identifier associated with the data's VCI.

6. The method of claim 1, wherein the fairness algorithm is a round robin algorithm.

7. The method of claim 1, further comprising:
   interconnecting the plurality of interface units such that
      a top-level interface unit connects to a network trunk, and
      each non-top-level interface unit connects to an interface unit at a next higher level.

8. The method of claim 7, wherein the interface units are arranged in a tree configuration.

9. The method of claim 7, wherein the interface units are arranged in a daisy-chain configuration.

10. The method of claim 1, wherein each queue comprises plural sub-queues, each sub-queue associated with a different priority, and wherein issuing data from a queue comprises:
   issuing data from the queue's highest priority sub-queue that contains data.

11. A first interface unit, comprising:
   a first input port for connecting to at least two subtended interface units, each subtended unit having the capability to connect with additional subtended interface units, the first interface unit receiving data originating with the subtended interface units;
   a second input port for receiving local data;
   an output port for connecting to one of: a higher-level interface unit and a network trunk;
   a plurality of queues, each subtended interface unit being associated with an individual queue, received data originating from any of the subtended interface units being forwarded to the queue associated with said subtended interface unit, and at least one of said queues for the received local data; and
   an issuer that issues data to the output port from the queues according to a fairness algorithm.

12. The interface unit of claim 11, wherein a unique queue identifier is assigned to each interface unit, such that a queue is associated with an interface unit by associating the queue with the respective interface unit's queue identifier, the interface unit further comprising:
   a data tagger which tags local data with the interface unit's queue identifier, non-local data received from a second interface unit having already been tagged; and
   a sorter which forwards received data to a queue according to the data's tag.

13. The interface unit of claim 12, wherein data is formatted as asynchronous transfer mode (ATM) cells.

14. The interface unit of claim 13, wherein an ATM cell comprises a generic flow control (GFC) field, wherein the tagger tags local data by inserting the respective interface unit's queue identifier into the GFC field.

15. The interface unit of claim 14, an ATM cell comprising a virtual channel identifier (VCI), the interface unit further comprising:
  a table of associations between VCIs and interface unit queue identifiers, the sorter forwarding received data to a queue responsive to an interface unit queue identifier associated with the data's VCI.

16. The interface unit of claim 11, wherein the fairness algorithm is a round robin algorithm.

17. The interface unit of claim 11, wherein the interface unit is interconnected with a plurality of interface units such that
  a top-level interface unit connects to a network trunk, and
  each non-top-level interface unit connects to an interface unit at a next higher level.

18. The interface unit of claim 17, wherein the plurality of interface units are arranged in a tree configuration.

19. The interface unit of claim 17, wherein the plurality of interface units are arranged in a daisy-chain configuration.

20. The interface unit of claim 11, wherein each queue comprises plural sub-queues, each sub-queue associated with a different priority, and wherein issuing data from a queue comprises:
  issuing data from the queue's highest priority sub-queue that contains data.

21. A first interface unit, comprising:
  means for receiving local data;
  means for tagging the received local data with an interface unit queue identifier associated with the first interface unit;
  means for receiving data from at least one interface unit subtended by the first interface unit, said data having been tagged with an interface unit queue identifier uniquely associated with a subtended interface unit in which said data originated;
  means for queuing received data according to the interface unit queue identifier with which said data is tagged; and
  means for issuing data from the queuing means according to a fairness algorithm.

22. The interface unit of claim 21, wherein data is formatted as asynchronous transfer mode (ATM) cells.

23. The interface unit of claim. 22, wherein an ATM cell comprises a generic flow control (GFC) field, wherein tagging local data in each interface unit comprises inserting the respective interface unit's queue identifier into the GFC field.

24. The interface unit of claim 22, wherein an ATM cell comprises a virtual channel identifier (VCI), further comprising:
  means for maintaining associations between VCIs and interface unit queue identifiers, wherein forwarding received data to a queue is responsive to an interface unit queue identifier associated with the data's VCI.

25. The interface unit of claim 21, wherein the fairness algorithm is a round robin algorithm.

26. The interface unit of claim 21, wherein the interface units are interconnected such that
  a top-level interface unit connects to a network trunk, and
  each non-top-level interface unit connects to an interface unit at a next higher level.

27. The interface unit of claim 26, wherein the interface units are arranged in a tree configuration.

28. The interface unit of claim 26, wherein the interface units are arranged in a daisy-chain configuration.

29. The interface unit of claim 21, wherein the queuing means comprises plural sub-queue means, each sub-queue means associated with a different priority, and wherein said means for issuing data comprises:
  means for issuing data from said queuing means highest priority sub-queue means that contains data.

30. A computer program product for ensuring fair access to upstream trunk bandwidth among a plurality of interface units, the computer program product comprising a computer usable medium having computer readable code thereon, including program code which, in a first interface unit:
  tags received local data with an interface unit queue identifier uniquely associated with the first interface unit;
  queues received local and non-local data according to tagged interface unit queue identifiers, received non-local data having been tagged, by an interface unit subtended by the first interface unit and in which said data originated, with a queue identifier corresponding uniquely to said subtended interface unit; and
  issues data from queues according to a fairness algorithm.

31. The computer program product of claim 30, wherein data is formatted as asynchronous transfer mode (ATM) cells.

32. The computer program product of claim 31, wherein an ATM cell comprises a generic flow control (GFC) field, wherein tagging local data in each interface unit comprises inserting the respective interface unit's queue identifier into the GFC field.

33. The computer program product of claim 31 wherein an ATM cell comprises a virtual channel identifier (VCI), further comprising program code which:
  maintains a table of associations between VCIs and interface unit queue identifiers, wherein received data is forwarded to a queue responsive to an interface unit queue identifier associated with the data's VCI.

34. The computer program product of claim 30, wherein the fairness algorithm is a round robin algorithm.

35. The computer program product of claim 30, wherein the interface units are interconnected such that
  a top-level interface unit connects to a network trunk, and
  each non-top-level interface unit connects to an interface unit at a next higher level.

36. The computer program product of claim 35, wherein the interface units are arranged in a tree configuration.

37. The computer program product of claim 35, wherein the interface units are arranged in a daisy-chain configuration.

38. The computer program product of claim 30, wherein each queue comprises plural sub-queues, each sub-queue associated with a different priority, and wherein said program code which issues data from a queue further comprises program code which:
  issues data from said queue's highest priority sub-queue that contains data.

39. A computer system comprising:
  a processor located within a first interface unit;
  a memory system connected to the processor; and a computer program, in the memory, which:
tags received local data with an interface unit queue identifier uniquely associated with the first interface unit;
queues received local and non-local data according to tagged interface unit queue identifiers, received non-local data having been tagged, by an interface unit subtended by the first interface unit and in which said data originated, with an interface unit queue identifier corresponding uniquely to said subtended interface unit; and
issues data from queues according to a fairness algorithm.

40. The computer system of claim 39, wherein data is formatted as asynchronous transfer mode (ATM) cells.

41. The computer system of claim 40, wherein an ATM cell comprises a generic flow control (GFC) field, wherein tagging local data in each interface unit comprises inserting the respective interface unit's queue identifier into the GFC field.

42. The computer system of claim 40, wherein an ATM cell comprises a virtual channel identifier (VCI), wherein the computer program further:
maintains a table of associations between VCIs and interface unit queue identifiers, wherein received data is forwarded to a queue responsive to an interface unit queues identifier associated with the data's VCI.

43. The computer system of claim 39, wherein the fairness algorithm is a round robin algorithm.

44. The computer system of claim 39, wherein the interface units are interconnected such that
a top-level interface unit connects to a network trunk, and
each non-top-level interface unit connects to an interface unit at a next higher level.

45. The computer system of claim 44, wherein the interface units are arranged in a tree configuration.

46. The computer system of claim 44, wherein the interface units are arranged in a daisy-chain configuration.

47. The computer system of claim 39, wherein each queue comprises plural sub-queues, each sub-queue associated with a different priority, and wherein said computer program issues data from a queue by issuing data from said queue's highest priority sub-queue that contains data.

48. A computer data signal embodied in a carrier wave for ensuring fair access to upstream trunk bandwidth among a plurality of interface units, the plurality of interface units including, a first interface unit and at least one interface unit subtended by the first interface unit, comprising:
program code for tagging, in the first interface unit, received local data with an interface unit queue identifier uniquely associated with the first interface unit;
program code for queuing, in the first interface unit, received local and non-local data according to tagged interface unit queue identifiers, received non-local data having been previously tagged, by an interface unit subtended by the first interface unit and in which said data originated, with an interface unit queue identifier uniquely associated with said subtended interface unit; and
program code for issuing, in the first interface unit, data from the queues according to a fairness algorithm.

49. The computer data signal of claim 48, wherein data is formatted as asynchronous transfer mode (ATM) cells.

50. The computer data signal of claim 49, wherein an ATM cell comprises a generic flow control (GFC) field, wherein tagging local data in each interface unit comprises inserting the respective interface unit's queue identifier into the GFC field.

51. The computer data signal of claim 49, wherein an ATM cell comprises a virtual channel identifier (VCI), further comprising:
program code for maintaining associations between VCIs and interface unit queue identifiers, wherein received data is forwarded to a queue responsive to an interface unit queue identifier associated with the data's VCI.

52. The computer data signal of claim 48, wherein the fairness algorithm is a round robin algorithm.

53. The computer data signal of claim 48, wherein the interface units are interconnected such that
a top-level interface unit connects to a network trunk, and
each non-top-level interface unit connects to an interface unit at a next higher level.

54. The computer data signal of claim 53, wherein the interface units are arranged in a tree configuration.

55. The computer data signal of claim 53, wherein the interface units are arranged in a daisy-chain configuration.

56. The computer data signal of claim 48, wherein each queue comprises plural sub-queues, each sub-queue associated with a different priority, and wherein said program code for issuing data from a queue issues data from said queue's highest priority sub-queue that contains data.

57. A method for ensuring fair access to upstream trunk bandwidth among a plurality of interface units arranged hierarchically, a top-level interface unit connecting to a trunk port, comprising, in each interface unit:
associating each interface unit subtended by said unit with an individual queue;
receiving local data at a first input port, and forwarding the received local data to a queue associated with said interface unit;
receiving at a second input port data originating from at least two interface units subtended by said unit;
forwarding the received data originating from interface units subtended by said unit to the individual queues according to the originating subtended interface units;
in each subtended interface unit, issuing data from the queues to said interface unit's subtending interface unit according to a fairness algorithm; and
in the top-level interface unit, issuing data from the queues to the trunk port according to a fairness algorithm.

* * * * *

UNITED STATES PATENT AND TRADEMARK OFFICE
CERTIFICATE OF CORRECTION

PATENT NO.   : 6,769,043 B1
DATED        : July 27, 2004
INVENTOR(S)  : Guy C. Fedorkow et al.

It is certified that error appears in the above-identified patent and that said Letters Patent is hereby corrected as shown below:

Column 8,
Line 12, delete "means" and insert -- means' --.

Signed and Sealed this

Thirtieth Day of November, 2004

JON W. DUDAS
*Director of the United States Patent and Trademark Office*